June 20, 1967  N. B. WENK, JR  3,326,589

TAGGING SEAL

Filed Sept. 23, 1965

INVENTOR.
NORMAN B. WENK, Jr.
BY
*Percy Freeman*
ATTORNEY

United States Patent Office 3,326,589
Patented June 20, 1967

3,326,589
TAGGING SEAL
Norman B. Wenk, Jr., Garden City, N.Y., assignor to American Casting and Manufacturing Corporation, Plainview, N.Y., a corporation of New York
Filed Sept. 23, 1965, Ser. No. 489,585
1 Claim. (Cl. 292—307)

ABSTRACT OF THE DISCLOSURE

The invention relates generally to seals and methods of sealing and contemplates the embracing securement of a tie in the inner convolution of a spiral tube to positively prohibit removal and replacement of a tie-end with respect to the spiral tube without defacement or mutilation of the latter, said embracing securement being achieved by a simple hand press flattening the spiral tubes to distort them into a substantially flush, firm edge-to-edge engagement with each other.

*Background of the invention*

This invention is particularly concerned with seals and sealing of the type employed in conjunction with food products, meters, and other kinds of articles or materials.

As is well known to those versed in the art, the desired effect of such seals is to indicate tampering, as by removal or defacement of the seal. Toward this end, it has been attempted to provide seal constructions and sealing methods resulting in seals which cannot be removed and replaced without defacing or mutilating the seal, or otherwise resulting in evidence of tampering.

*Summary of the invention*

Accordingly, it is an important object of the present invention to provide a seal construction and method of sealing which more positively insures evidence resulting from tampering.

The seal construction and method of the present invention further contemplates the embracing securement of a tie in the inner convolution of a spiral tube to positively prohibit removal and replacement of a tie end with respect to the spiral tube without defacement or mutilation of the latter.

It is still another object of the present invention to provide a seal construction and method which is extremely simple to manufacture, and which can be more quickly and easily applied by persons having no special experience or skill.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

*Description of the preferred embodiment*

Figure 5:
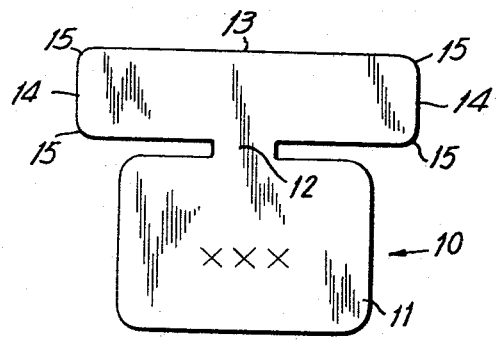
FIGURE 5 is a plan view showing a blank employed in formation of the seal of FIGURES 1–4.

Referring now more particularly to the drawings, and specifically to FIGURE 5, the blank illustrated therein is generally designated 10, and may be integrally formed of flat sheet material, such as aluminum or other suitably deformable material. The blank 10 may include a relatively large seal body 11 adapted to be impressed with desired indicia, such as a serial number, trademark, or the like. Extending integrally from one peripheral edge portion of the body 11 is a reduced neck or extension 12. The outer end of the neck or extension 12 is provided with an integral enlargement 13 which may be considered as defined by a pair of oppositely outwardly extending tabs 14. Thus, the enlargement 13 is of generally rectangular-outline configuration, being elongate in the direction of opposite extension of the tabs 14. The tabs 14 may have their outer ends reduced, as by rounded corners 15, if desired.

Figure 1:
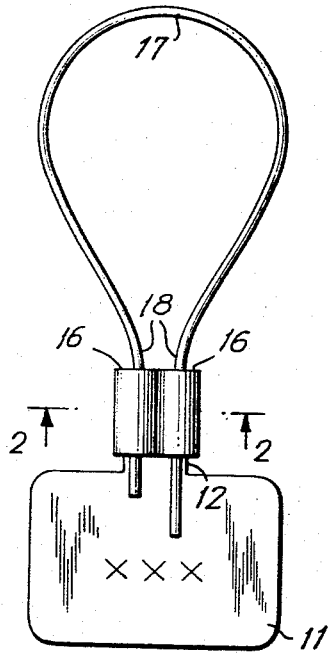
FIGURE 1 is a front view showing a seal constructed in accordance with the teachings of the instant invention, prior to use.
Figure 2:
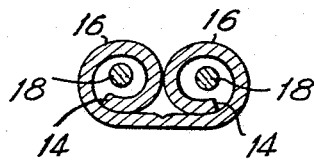
FIGURE 2 is a sectional view taken generally along the line 2—2 of FIGURE 1.

In accordance with the method of the instant invention, the blank 10 of FIGURE 5 is further formed by rolling or curling each of the tabs 14 spirally inwardly in opposite angular directions toward each other approximately one and a half convolutions, and in any case greater than 360 degrees. This inward spiral rolling of the tabs 14 toward each other results in a pair of spiral tubes, as at 16 in FIGURES 1 and 2.

Further, the tabs 14 are spirally rolled inward toward each other until the tubular spirals 16 meet in side-by-side abutting engagement with each other. In this condition, a flexible tie 17, say of plastic, metal wire, or the like, may have its opposite end portions 18 inserted endwise into respective spirals or tubes 16, best seen in FIGURE 2. It will there be apparent that the tie ends 18 are each inserted within the innermost convolution of the respective tube 16.

For shipment and storage a single one of the tubes 16 may be flattened, the flattened tube thus providing an anchor for one tie end 18 to prevent loss thereof prior to use.

Figure 3:
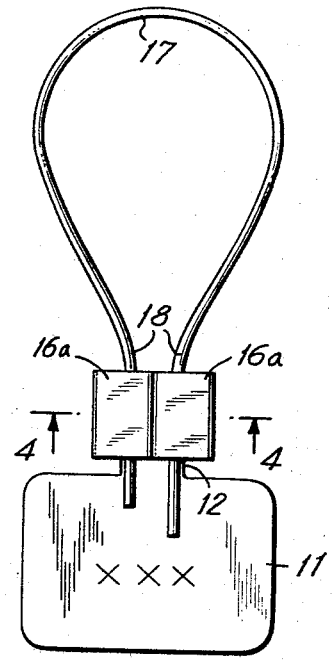
FIGURE 3 is a front view similar to FIGURE 1, showing the seal in its condition of use.
Figure 4:
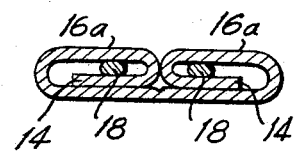
FIGURE 4 is a sectional view taken generally along the line 4—4 of FIGURE 3.

When the seal is to be applied to a meter or other article, the unsecured tie end 18 may be engaged through the article and reinserted into its respective spiral tube 16. By a simple hand press the spiral tubes may then be flattened, to the condition shown at 16a in FIGURES 3 and 4. It will there be apparent that the tie ends 18 are each firmly embraced or clamped in the inner convolution of its respective flattened tube 16a, for positive retention therein. Further, the flattened tubes 16a are distorted into a substantially flush, firm edge-to-edge engagement with each other. In this condition, removal and replacement of a tie end 18 would require substantially complete unrolling of a flattened tube 16a, and re-rolling thereof. This procedure, of itself, would be impossible without showing signs of tampering. Further, such a tampering operation upon one of the tubes 16a would, in all probability, result in defacement or mutilation of the contiguous, firmly abutting adjacent tube.

In view of the foregoing, it is seen that the present invention provides a seal construction and method of sealing which fully accomplish their intended objects and are well adapted to meet practical conditions of manufacture, application, and use.

Although the present invention has been described in some detail by way of illustration and example for purposes of clarity of understanding, it is understood that certain changes and modifications may be made within the spirit of the invention and scope of the appended claim.

What is claimed is:

A seal construction comprising a seal body, a pair of oppositely extending tabs carried by said body, said tabs each being rolled inwardly toward the other to define a tubular spiral of more than 360 degrees, said rolled tubular spirals being in side-by-side tangentially abutting engagement, and a flexible tie having its opposite ends extending into respective tubular spirals, said tubular spirals being flattened to firmly embrace each other tangentially and each of said tie ends within the inner convolution of a respective tubular spiral, whereby tie-end removal requires unrolling and re-rolling of the tubular spirals to result in evidence of tampering, and whereby tampering with one tubular spiral defaces the other, said body and tubular spirals being integrally fabricated of a single sheet of deformable material.

References Cited

UNITED STATES PATENTS

| 235,668 | 12/1880 | Brooks. | |
| 745,036 | 11/1903 | Brooks | 292—310 |
| 990,629 | 4/1911 | Brooks | 292—310 |

FOREIGN PATENTS

| 22,130 | 4/1912 | Norway. |

MARVIN A. CHAMPION, *Primary Examiner.*

RICHARD E. MOORE, *Examiner.*